Aug. 21, 1928.

J. W. WHITELOCK ET AL 1,681,204

ADJUSTABLE BEARING

Filed July 22, 1925

INVENTORS:
James W. Whitelock,
James W. Case,
BY
R. W. Smith
ATTORNEY.

Patented Aug. 21, 1928.

1,681,204

UNITED STATES PATENT OFFICE.

JAMES W. WHITELOCK AND JAMES W. CASE, OF LA HABRA, CALIFORNIA.

ADJUSTABLE BEARING.

Application filed July 22, 1925. Serial No. 45,237.

It is the object of this invention to provide a wrist-pin bearing for the pitman of a well pumping apparatus, which may be quickly and accurately adjusted and locked in desired position, and which provides an extremely simple but durable structure adapted for mounting in the usual bearing slot provided in a pitman.

It is a further object of the invention to provide a bearing adapted for continuous automatic lubrication thereof, by providing a lubricating reservoir feeding directly to the bearing surface.

The invention will be readily understood from the following description of the accompanying drawings, in which.

Figure 1:
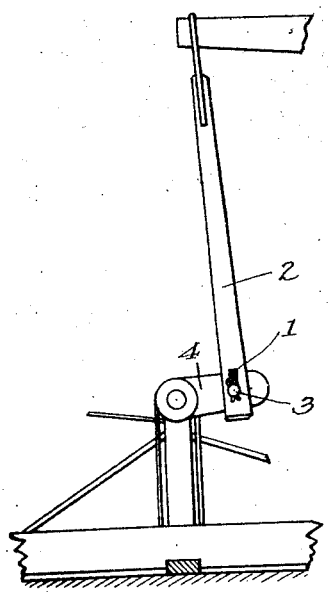
Fig. 1 is a side elevation of the pitman and operating connections of a well pumping apparatus.
Figure 2:
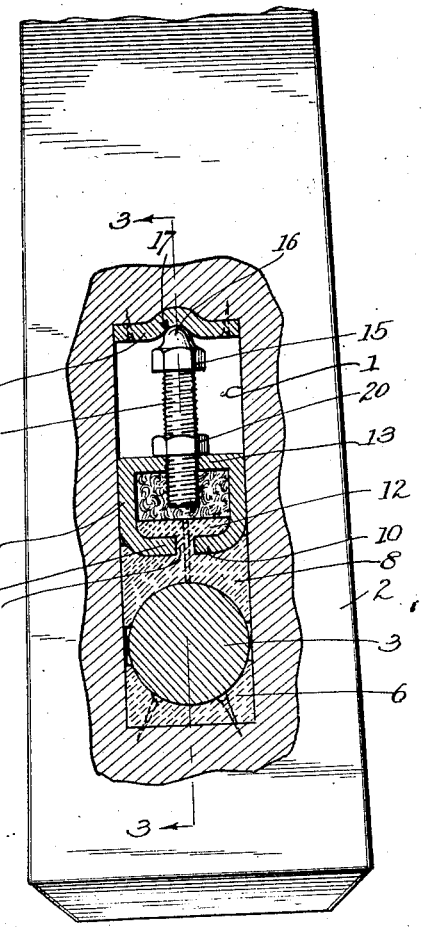
Fig. 2 is a front elevation, partly in vertical section, of the wrist-pin bearing mounted in a pitman.

The improved bearing is adapted for mounting in the usual slot 1 extending through the pitman 2 of a well pumping apparatus, the bearing having the wrist-pin 3 of the operating crank 4 journaled therein, with the crank and the retaining washer 5 which is provided on the end of the wrist-pin abutting against opposite sides of the bearing for retaining the same in the slot.

The bearing comprises half-bearing 6 fixed in the lower end of slot 1 by suitable fastening means 7, and cooperating half-bearing 8 adjustable in the slot with the wrist-pin journaled between the cooperating half-bearings. The back of the adjustable half-bearing is cast in a block 9 which forms a reservoir for a lubricant and is slidable in the slot.

The block 9 is a hollow structure having closed sides and ends and an open top and bottom, and having extensions 10 of its side walls extending across its open base medially of the block and terminating short of one another so as to form a slot extending transversely of the block.

The back of half-bearing 8 which is cast in the open base of block 9, forms a restricted portion 11 extending through the slot and a web 12 at the upper end of said restricted portion overlying the entire open base of the block and resting upon the extensions 10.

A medial transverse plate 13 connects the side walls of block 9 at its open top, and this plate is threaded to receive an adjusting screw 14. The upper end of the screw forms an operating nut 15, which terminates in a bearing abutment 16 journaled in a cooperating bearing recess 17 provided in an end plate 18 which is fixed against the upper end of slot 1 by suitable fastening means 19.

An end thrust is thus provided for screw 14 so that when nut 15 is engaged by a suitable wrench for turning the screw, the block 9 and the half-bearing 8 which is fixed thereto will be longitudinally adjusted in slot 1 relative to the fixed half-bearing 6. The parts are preferably locked in adjusted position by a nut 20 threaded on screw 14 and adapted to be screwed down against plate 13 to hold the screw against turning.

Figure 3:
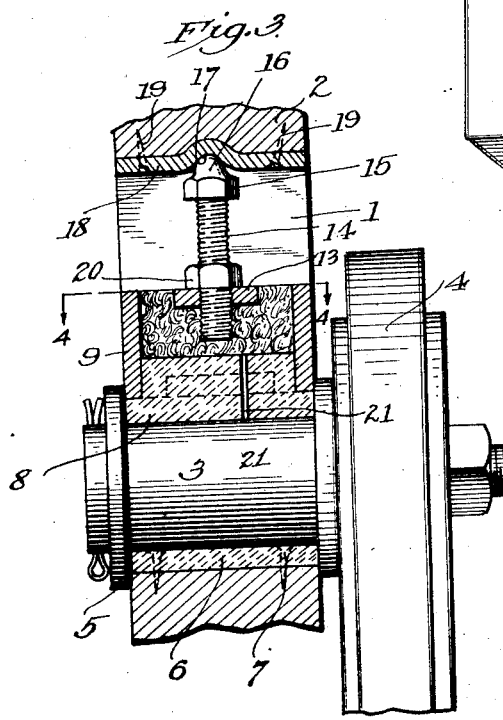
Fig. 3 is a vertical section on the line 3—3 of Fig. 2.
Figure 4:
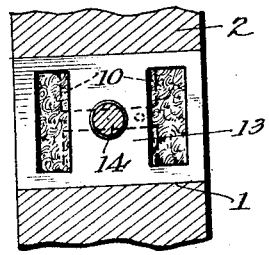
Fig. 4 is a transverse section on the line 4—4 of Fig. 3.

A lubricating bore 21 extends through the restricted portion 11 of half-bearing 8 and opens through the bearing surface at one end, and at its opposite end communicates with the reservoir formed in hollow block 9 above the web 12. The reservoir in the hollow block is filled with a suitable lubricant such as oil soaked waste, and lubricating bore 21 is preferably in non-alinement with screw 14 as shown in Fig. 3, so that the screw will not obstruct the flow of lubricant to the bearing surface. The bearing surface is thus supplied with lubricant from the oil reservoir, and at the same time the end of the screw threaded through plate 13 and extending into the oil reservoir is supplied with lubricant from the reservoir in order to insure ease of adjustment of the screw through the plate.

We claim:

1. A bearing adapted for mounting in a member having a slot extending therethrough, comprising cooperating half-bearings, one of said half-bearings being mounted in the end of said slot, a hollow block slidable in the slot and open at its top and bottom, said block having webs partially closing the bottom thereof, the other half-bearing having a back cast in the lower portion of the hollow block and resting upon said webs to prevent displacement of said other half-bearing from said block and close the open lower end of the block, said half-bearing having a bore opening therethrough to the bearing surface and communicating with the upper portion of the hollow block which forms a reservoir, and means for adjusting the block and half-bearing which is mounted thereon relative to the other half-bearing.

2. The combination of a split bearing, a hollow block open at its bottom and having webs projecting from its side walls, and a backing on one section of the split bearing adapted for reception in the open bottom of the hollow block with the projecting webs overlying the backing so as to prevent displacement of the section of the split bearing on which the backing is formed and close the bottom of the hollow block whereby the hollow block forms a reservoir, the backing and the section of the split bearing upon which it is formed having a bore opening therethrough from the reservoir to the bearing surface of the split bearing.

3. The combination of a split bearing, a hollow block open at its bottom and having webs projecting from its side walls, a backing on one section of the split bearing adapted for reception in the open bottom of the hollow block with the projecting webs overlying the backing so as to prevent displacement of the section of the split bearing on which the backing is formed and close the bottom of the hollow block whereby the hollow block forms a reservoir, the backing and the section of the split bearing upon which it is formed having a bore opening therethrough from the reservoir to the bearing surface of the split bearing, and means for adjusting the hollow block and the bearing section which is mounted thereon relative to the other section of the split bearing.

4. The combination of a split bearing, a hollow block open at its bottom and having webs projecting from its side walls, a backing on one section of the split bearing adapted for reception in the open bottom of the hollow block with the projecting webs overlying the backing so as to prevent displacement of the section of the split bearing on which the backing is formed and close the bottom of the hollow block whereby the hollow block forms a reservoir, the backing and the section of the split bearing upon which it is formed having a bore opening therethrough from the reservoir to the bearing surface of the split bearing, and an adjusting screw engaging the hollow block for adjusting the block and the bearing section which is mounted thereon relative to the other section of the split bearing.

In testimony whereof we have affixed our signatures to this specification.

JAMES W. WHITELOCK.
JAMES W. CASE.